ENERGY LEVELS AND TRANSITIONS IN A TWO-STEP PHOSPHOR

EXCITATION SPECTRUM OF $La_{0.87}Yb_{0.12}Er_{0.01}F_3$

EMISSION SPECTRUM OF $La_{0.79}Yb_{0.20}Tm_{0.01}F_3$

EMISSION SPECTRUM OF $La_{0.85}Yb_{0.14}Er_{0.01}F_3$

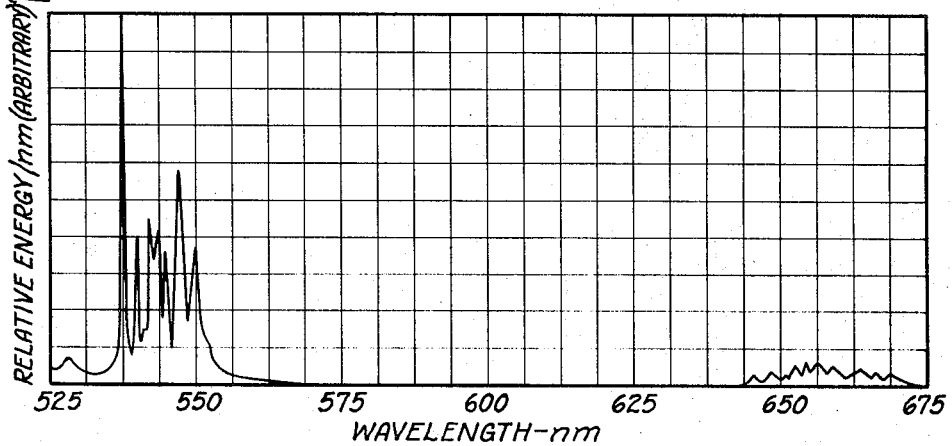

Fig. 5.

EMISSION SPECTRUM OF $Gd_{0.89}Yb_{0.10}Er_{0.01}F_3$

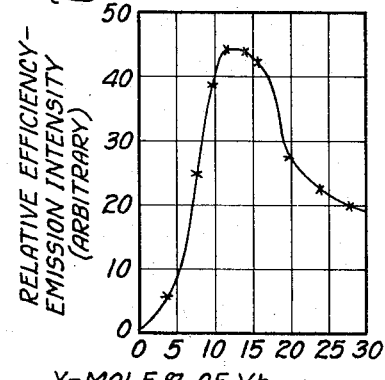

Fig. 6.

DEPENDENCE OF RELATIVE EFFICIENCY OF INFRARED ($\approx 1\mu$) EXCITATION UPON Yb CONCENTRATION FOR $La_{0.99-\frac{x}{100}}Yb_{\frac{x}{100}}Er_{0.01}F_3$

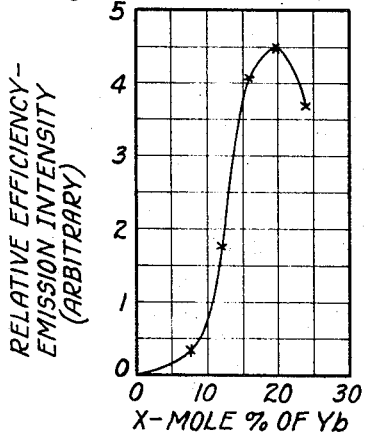

Fig. 7.

DEPENDENCE OF RELATIVE EFFICIENCY WITH INFRARED ($\approx 1\mu$) EXCITATION UPON Yb CONCENTRATION FOR $La_{0.9985-\frac{x}{100}}Yb_{\frac{x}{100}}Tm_{0.0015}F_3$

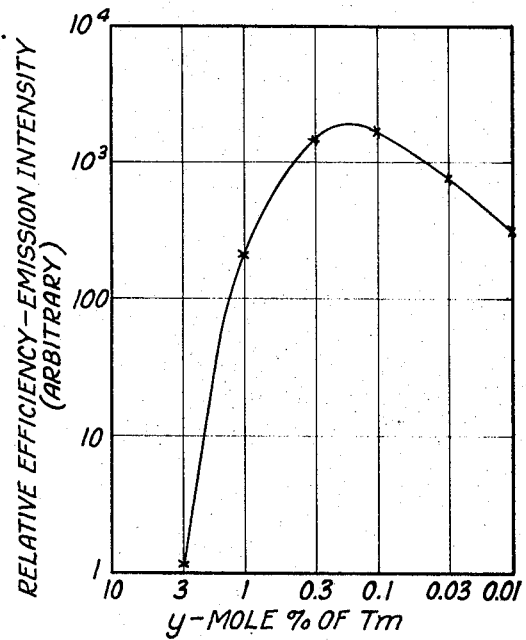

Fig. 8.

DEPENDENCE OF RELATIVE EFFICIENCY WITH INFRARED ($\approx 1\mu$) EXCITATION UPON Tm CONCENTRATION FOR $La_{0.90-\frac{y}{100}}Yb_{0.10}Tm_{\frac{y}{100}}F_3$ Inventors:
Ralph A. Hewes
James F. Sarver
by *Richard H. Burgess*
Their Attorney United States Patent Office 3,541,018
Patented Nov. 17, 1970

3,541,018
INFRARED-EXCITABLE YTTERBIUM SENSITIZED ERBIUM OR THULIUM ACTIVATED RARE EARTH FLOURIDE LUMINESCENT MATERIAL
Ralph A. Hewes, Cleveland Heights, and James F. Sarver, Lyndhurst, Ohio, assignors to General Electric Company, a corporation of New York
Continuation-in-part of application Ser. No. 716,898, Mar. 28, 1968. This application Sept. 18, 1968, Ser. No. 767,038
Int. Cl. C09k 1/06
U.S. Cl. 252—301.4                    17 Claims

ABSTRACT OF THE DISCLOSURE

Fluorides of lanthanum, gadolinium, yttrium and lutetium, activated with erbium or thulium, and containing ytterbium as a sensitizer can be efficiently excited respectively to green and blue luminescence by infrared radiation, and then can be used in certain light-producing applications. Such materials can be made by reacting the respective oxides, preferably mixed, with anhydrous hydrogen fluoride to avoid contamination with oxygen or hydroxyl ions.

CROSS-REFERENCES TO RELATED APPLICATIONS

This application is a continuation-in-part of application Ser. No. 716,898 filed Mar. 28 1968, now abandoned, in the names of Ralph A. Hewes and James F. Sarver. Copending application Ser. No. 716,921, Ralph A. Hewes, also filed Mar. 28, 1968, discloses and claims erbium- or thulium-activated, ytterbium-sensitized oxysulfides or lanthanum, gadolinium and yttrium.

A specific application of the luminescent materials of the present invention is described in detail and claimed in copending application Ser. No. 716,897 filed Mar. 28, 1968 in the names of Ralph M. Potter and Simeon V. Galginaitis, hereby incorporated into this application by reference. That application in certain embodiments involves use of a doped gallium arsenide infrared-emitting diode coated with phosphor which can be phosphor of the present invention. The infrared radiation emitted by the diode and the excitation spectrum of the phosphor interact as a combination to produce green light.

The three above-cited applications are assigned to the assignee of the present invention.

BACKGROUND OF THE INVENTION

The present invention relates to inorganic crystalline luminescent material. More particularly, it relates to such material which can be excited to produce visible radiation by infrared stimulation.

In 1852, Stokes noted that fluorescent light was usually less refrangible (had longer wavelengths) than the exciting light. The proposition that longer wavelength light could not normally be used to generate shorter wavelength light in phosphors became known as Stokes Law, and the few phosphors which were exceptions to this law were eventually known as anti-Stokes phosphors. Since infrared light is beyond the long-wavelength end of the visible spectrum, any light-emitting, infrared-stimulable phosphors would be anti-Stokes phosphors. No such infrared-stimulable phosphors have been known to be sufficiently efficient for the production of visible light in commercially feasible devices.

Essentially all present commercial applications of phosphors for the production of visible light by photoluminescent excitation utilize ultraviolet or, in some cases, visible light excitation. Such ultraviolet or visible exciting light is normally produced in commercial lamps by electric discharges in arcs.

Incandescent lamps, on the other hand, produce light by heating a filament to incandescent temperatures at which substantial amounts of visible light are emitted. However, large amounts of the input energy used to heat the filament to incandescence are dissipated as infrared light also produced by the incandescent filament. It would be very desirable to have an efficient phosphor which could convert such infrared light to visible light, thereby supplementing the visible light portion of the output of an incandescent lamp and utilizing the otherwise wasted infrared emission.

Other light sources can be made to emit primarily infrared light, such as the gallium arsenide light-emitting diode disclosed and claimed in the above-identified application of Potter and Galginaitis in conjunction with phosphors of the present invention.

It would be desirable to have a phosphor which could be excited by such infrared emission to produce light within the visible spectrum, but the few previously known infrared-stimulable anti-Stokes phosphors have not been sufficiently efficient to allow the production of a practical commercial product.

These are various scientific reasons why the light emitted by a phosphor is normally at longer wavelengths than the exciting light. Considered from the standpoint of electronic energy levels, after photoexcitation by light of a certain wavelength, there is some non-radiative energy decay or relaxation before the light-emitting transition back down to the ground state energy level, due to interaction of the activator with the lattice. Thus, the light emission comes from a smaller energy transition and is therefore of longer wavelength than the excitation. However, one anti-Stokes luminescent mechanism involves the us of double excitation. A quantum of light excites an electron up to one level, and then another quantum of light excites the same electron to a higher energy level. From this higher energy level, the electron can relax somewhat to a slightly lower level, and from there go through a transition back to the original ground state, thus producing light equivalent to an energy transition greater than the initial energy input but less than the total energy input from the two quanta. Being a higher energy transition than either of the input quanta, the emitted light has a shorter wavelength than the average wavelength of the exciting light. The two input quanta, of course, could either be of the same wavelength or of different wavelengths.

Such infrared-stimulable phosphors have been used in the past in infrared quantum counters. Phosphors that can produce shorter wavelength light from longer wavelength excitation have been shown to include: ZnCdS:Ag, Cu by R. M. Potter, J. Electrochem. Soc., 106, 58 C (1959), producing green light with orange and infrared excitation at room temperature; and $LaCl_3:Pr^{3+}$ by John F. Porter, Jr., Phys. Rev. Letters, 7, 414 (1961). Other phosphors useful for such purposes have been shown to include: $Na_{0.5}Yb_{0.49}Er_{0.01}WO_4$ by F. Auzel, Compt. Rend., 262 B, 1016 (1966); $CaWO_4:Er$; and (Ca, Ba):(Tm, Er, Ho)Yb; however, none of these phosphors were sufficiently bright to be usable commercially for the production of visible radiation by utilizing infrared radiation.

SUMMARY OF THE INVENTION

It is an object of the present invention to provide an efficient infrared-stimulable, visible light-emitting luminescent material. A further object is to provide such material which is efficient enough for utilization in commercial lamps for the production of visible light.

Briefly stated, the present invention in certain of its embodiments provides a fluoride of at least one of the metals lanthanum, gadolinium, yttrium and lutetium activated by at least one of the elements erbium and thulium and containing sufficient quantities of ytterbium in the matrix to enhance the luminescence of said fluoride in response to excitation by infrared light. Preferred forms of such materials contain activator quantities of at least one of erbium and thulium, preferably in amount of about 0.001 to 0.10 mole of erbium or about 0.00005 to 0.03 mole thulium, and also contain sensitizer quantities of ytterbium, preferably 0.04 to 0.80 mole, more preferably 0.04 to 0.30 mole, each measured per mole of fluoride. These phosphors are generally in accord with the formula $Ln_{1-x-y}Yb_xR_yF_3$ wherein Ln is at least one of Y, La, Gd, or Lu, and R is Er or Tm. Three optimum specific formulae of the invention are $La_{0.86}Yb_{0.12}Er_{0.02}F_3$, $La_{0.7985}Yb_{0.20}Tm_{0.0015}F_3$, and $Gd_{0.5985}Yb_{0.40}Tm_{0.0015}F_3$. The invention also provides preferred methods for the production of such phosphors in which the respective oxides are reacted with anhydrous hydrogen fluoride at elevated temperatures to produce the fluoride phosphor essentially free from deleterious oxide and hydroxyl impurities. In a preferred process, the constituents are first coprecipitated as oxalates which are fired to the oxides for reaction with hydrogen fluoride.

BRIEF DESCRIPTION OF THE DRAWING

FIG. 5 is the same for $GdF_3$:Yb, Er.

FIG. 6 is a graph of Yb concentration in $LaF_3$:Yb, Er versus relative efficiency, and FIG. 7 is the same for $LaF_3$:Yb, Tm.

FIG. 8 is a graph of Tm concentration in $LaF_3$:Yb, Tm versus relative efficiency.

DESCRIPTION OF THE PREFERRED EMBODIMENTS

In phosphors of the present invention, the Yb acts as a sensitizer, absorbing in a broad band peaking at $0.975\mu$, and transfers the energy to the activator ion (Er or Tm) by various mechanisms. In the case of $LaF_3$:Yb, Er, the intensity of the Er luminescence depends upon both the amount of the Yb present and upon the intensity of the incident radiation lying within the Yb absorption band, and depends quadratically upon the intensity of the incident radiation in the range of intensities measured. This fact indicates that two infrared quanta are required to produce one visible light quantum.

Figure 1:
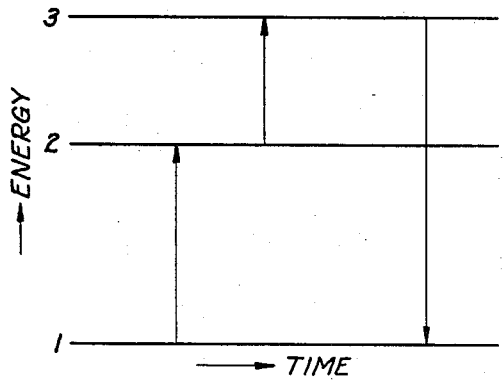
FIG. 1 is a general schematic energy level diagram of a two-step excitation and luminescence process.

FIG. 1 illustrates in the simplest form a process of excitation by two photons followed by a luminescent transition of higher energy than either of the two input photons.

In the case of Tm-activated phospsors, the power dependence of the intensity of the luminescence upon the incident exciting intensity lies between two and three, indicating that at least two infrared photons are required to excite the luminescence. The phenomenon of energy transfer from $Yb^{+3}$ ions to $Er^{+3}$ ions and $Tm^{+3}$ ions has been previously reported, but the use of the trifluoride hosts greatly increases the efficiency of the process.

Figure 2:
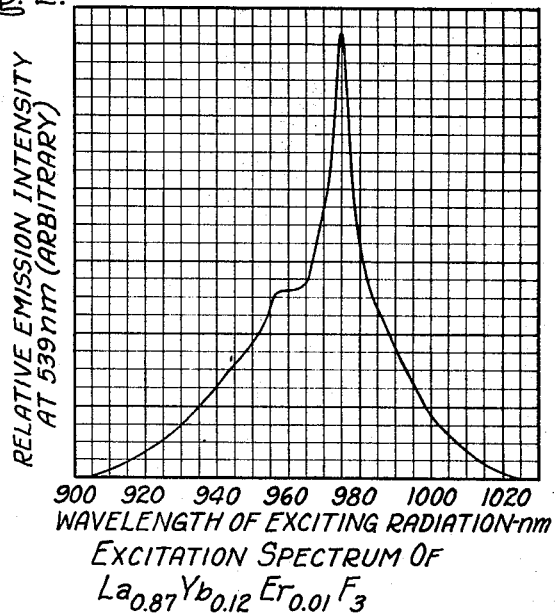
FIG. 2 is the excitation spectrum of $LaF_3$:Yb, Er.
Figure 4:
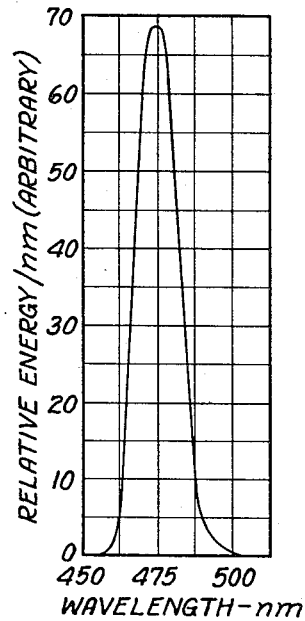
FIG. 4 is the same for $LaF_3$:Yb, Tm.
Figure 3:
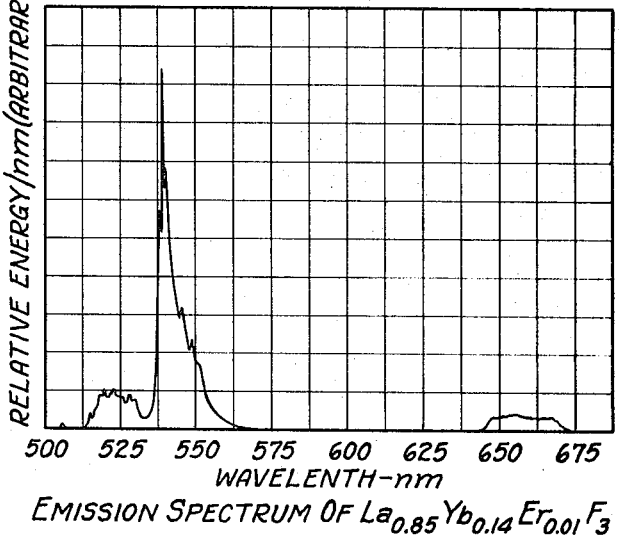
FIG. 3 is the emission spectrum of $LaF_3$:Yb, Er.

The excitation spectrum of $LaF_3$:Yb, Er, FIG. 2, basically coincides with the reflectance spectrum of $Yb^{+3}$ in $LaF_3$, not shown. This indicates that the principal absorption in the phosphor is by $Yb^{+3}$. The emission spectra of $LaF_3$:Yb, Er and $LaF_3$:Yb, Tm are shown in FIGS. 3 and 4 and are typical of the activators in $LaF_3$, even at varying concentrations.

Lanthanum trifluoride, $LaF_3$, and other trivalent rare earth fluorides such as $YbF_3$ can be synthesized in different ways. As known in the prior art, an oxide such as $La_2O_3$ can be reacted with an aqueous HF solution to form $LaF_3$, followed by a vacuum drying operation to remove moisture, or the oxide can be reacted with crystalline $NH_4F$ or $NH_4HF_2$ at elevated temperatures to form the fluoride. However, those methods can leave deleterious impurities. As another aspect of this invention, we have found that such impurities can be avoided by reacting the oxides together in the presence of anhydrous HF at elevated temperatures to produce the fluoride. This method insures the complete absence of deleterious oxygen or OH impurities in the fluorides, such as LnOF and $Ln(OH)_3$.

The reaction of anhydrous HF with rare earth oxides can occur at fairly low temperatures, such as 200 to 500° C., but in order to obtain well-crystallized fluorides it is desirable to carry out the reaction at much higher temperatures, such as 800 to 1300° C., 1000° C. being quite adequate in most cases. The higher temperature range is especially desirable in the case of phosphor preparation, for example, $LaF_3$ doped with the trivalent rare earth ions $Yb^{+3}$, $Er^{+3}$, and $Tm^{+3}$.

$LaF_3$ can be activated with rare earth ions by mechanically mixing appropriate quantities of the individual trifluorides, followed by a high temperature treatment to form the phosphor, a process not unlike ordinary phosphor techniques. However, this reaction would have to be carried out in an inert or HF atmosphere to yield pure fluorides.

The more desirable approach of the present invention for the preparation of rare earth activated $LaF_3$ phosphors has been developed and the various steps will be discussed using as an example the composition $$La_{0.85}Yb_{014}Er_{0.01}F_3$$

STEP 1

Weigh oxides to nearest 0.1 mg. Batch composition (0.06 mole $LnF_3$ basis).

| Moles: | | Grams |
|---|---|---|
| 0.0255 $La_2O_3$ | -- | 8.7404 $La_2O_3 \cdot xH_2O$ (4.94% $H_2O$) |
| 0.0042 $Yb_2O_3$ | -- | 1.6551 $Yb_2O_3$ |
| 0.0003 $Er_2O_3$ | -- | 0.1147 $Er_2O_3$ |

STEP 2

Dissolve oxides in 50 cc. deionized or distilled $H_2O + 11.25$ cc. concentrated $HNO_3$ by gentle heating.

STEP 3

Dilute to 250 cc. with deionized $H_2O$; allow to cool to room temperature.

STEP 4

Coprecipitate the rare earths as the oxalate with 100 cc. of 1 molar oxalic acid ($H_2C_2O_4 \cdot 2H_2O$); actually only 90 cc. react, but preferably about 10% excess is used.

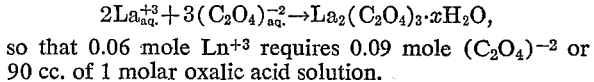

so that 0.06 mole $Ln^{+3}$ requires 0.09 mole $(C_2O_4)^{-2}$ or 90 cc. of 1 molar oxalic acid solution.

STEP 5

Vacuum filter oxalate precipitate from supernatant liquid and dry at 110° C.

STEP 6

Decompose oxalate to oxide at 750° C. in air,

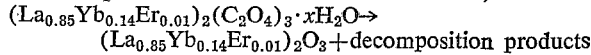

STEP 7

React oxide with anhydrous HF at 1000° C. to form the fluoride,

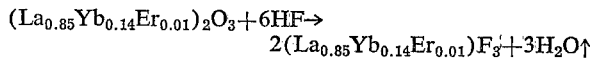

The HF is diluted with lamp-grade $N_2$ and the furnace is purged with $N_2$ following completion of the reaction.

The entire process can be scaled up or down depending upon the amount of phosphor material desired. In general, 99.9% pure rare earth oxides (99.997% in case of $La_2O_3$) are used as starting materials. Higher purity $La_2O_3$ (99.999%) can also be used, although no obvious benefits in phosphor efficiency are realized.

Step 7 is carried out in a platinum tube furnace and platinum boat. The HF is introduced to the furnace through copper and Teflon tubing, as known in the art. In our synthesis procedure, the HF flow rate is metered and a several fold excess of HF is used to insure completeness of reaction. In the case of the example described, approximately 18 liters of HF are used at a flow rate of 100 cc./min. over a period of about 3 hours. Of this amount, approximately only 4 liters are required to react with the oxide to form the fluoride.

The resulting phosphors are fine grained powder-like materials which require very little, if any, grinding for efficient utilization. These powders are useful as polycrystalline phosphors. They are also excellent sources of material for single crystal growth.

FIG. 6 shows that peak efficiency is reached in $LaF_3$:Yb, Er with about 12–16 mole percent Yb. From Table I it can be seen that little difference in efficiency is seen between 1 and 2% Er so that this value is an optimum. The $YF_3$ phosphors and the $LuF_3$ phosphors have emission spectra similar to those of the $GdF_3$ phosphors, see FIG. 5.

FIGS. 7 and 8 show that peak efficiency is realized in $LaF_3$:Yb, Tm with about 0.15 mole percent $Tm^{+3}$ and 20 mole percent $Yb^{+3}$. With $Tm^{+3}$ activation, sensitization does not fall off substantially until high Yb concentrations are reached. In $GdF_3$:Tm efficiency is still 25 to 30% of the maximum at 60% Yb, and in $YF_3$:Tm efficiency is about 50% of the maximum at 60% Yb. Beyond about 80% Yb efficiency is not at desirable levels.

Evidence of Yb sensitization of Er and Tm in phosphors of the invention as compared with certain much less bright calcium tungstate phosphors of the prior art is presented in the form of approximate relative efficiencies in Table I below.

TABLE I
[Yb sensitization of Er-activated Ln-fluorides]

| Unsensitized | | Sensitized | |
|---|---|---|---|
| Composition | Rel. eff. | Composition | Rel. eff. |
| $Ca_{0.985}Er_{0.01}WO_4$ | 27 | $Na_{0.5}Yb_{0.49}Er_{0.01}WO_4$ | 560 |
| $Ca_{0.98}Er_{0.01}Na_{0.01}WO_4$ | 39 | $Ca_{0.835}Yb_{0.10}Er_{0.01}WO_4$ | 1,200 |
| $La_{0.99}Er_{0.01}F_3$ | 100 | $Ca_{0.685}Yb_{0.20}Er_{0.01}WO_4$ | 1,200 |
| | | $La_{0.91}Yb_{0.08}Er_{0.01}F_3$ | 18,900 |
| | | $La_{0.89}Yb_{0.10}Er_{0.01}F_3$ | 28,900 |
| | | $La_{0.87}Yb_{0.12}Er_{0.01}F_3$ | 33,300 |
| | | $La_{0.85}Yb_{0.14}Er_{0.01}F_3$ | 33,000 |
| | | $La_{0.83}Yb_{0.16}Er_{0.01}F_3$ | 32,200 |
| | | $La_{0.79}Yb_{0.20}Er_{0.01}F_3$ | 20,800 |
| | | $La_{0.75}Yb_{0.24}Er_{0.01}F_3$ | 16,400 |
| | | $La_{0.71}Yb_{0.28}Er_{0.01}F_3$ | 15,100 |
| $La_{0.95}Er_{0.05}F_3$ | 159 | $La_{0.875}Yb_{0.12}Er_{0.005}F_3$ | 22,600 |
| | | $La_{0.86}Yb_{0.12}Er_{0.02}F_3$ | 35,300 |
| | | $Gd_{0.89}Yb_{0.10}Er_{0.01}F_3$ | 16,400 |
| | | $Y_{0.89}Yb_{0.10}Er_{0.01}F_3$ | 14,400 |
| | | $Lu_{0.89}Yb_{0.10}Er_{0.01}F_3$ | 13,700 |

Since Tm and Er are excited with different efficiencies by varying excitations, relative efficiencies of Tm-activated, Yb-sensitized phosphors are shown separately in Table II. These relative efficiencies can be compared within each table, but those of Table II cannot be compared with those of Table I. No unsensitized phosphors are shown in Table II because these phosphors with Tm activation show essentially no emission without Yb sensitization.

TABLE II
Yb-sensitized Tm-activated Ln-fluorides

Sensitized

Composition: Rel. eff.
$Gd_{0.5985}Yb_{0.40}Tm_{0.0015}F_3$ ---------------------- 918
$La_{0.7985}Yb_{0.20}Tm_{0.0015}F_3$ ---------------------- 551
$Y_{0.5985}Yb_{0.40}Tm_{0.0015}F_3$ ---------------------- 468
$Lu_{0.8985}Yb_{0.10}Tm_{0.0015}F_3$ ---------------------- 211

Examination of $LaF_3$:Yb, Er phosphors by means of powder X-ray diffraction techniques revealed that the solid solution limit of $YbF_3$ in $LaF_3$ is approximately 18 mole percent at 1000° C. $YbF_3$ concentrations beyond 20 mole percent lead to a second phase, namely $YbF_3$ which may contain some $LaF_3$ in solid solution. $YF_3$ and $YbF_3$ are isostructural as are $GdF_3$ and $YbF_3$, as well as $LuF_3$ and $YbF_3$, so that complete solid solubility is to be expected in these systems. This may lead to a maximum of efficiency in the $GdF_3$, $LuF_3$ and $YF_3$ materials at higher $YbF_3$ concentrations.

What we claim as new and desire to secure by Letters Patent of the United States is:

1. Luminescent material consisting essentially of: a fluoride of at least one of the metal lanthanum, gadolinium, yttrium and lutetium, activated by at least one of the elements erbium and thulium and containing sufficient quantities of ytterbium in the matrix to enhance the luminescence of said fluoride in response to excitation by infrared light.

2. Luminescent material according to claim 1 containing about 0.04 to 0.80 mole of ytterbium per mole of fluoride.

3. Luminescent material according to claim 1 in which the matrix is lanthanum fluoride.

4. Luminescent material according to claim 1 in which the matrix is yttrium fluoride.

5. Luminescent material according to claim 1 in which the matrix material is gadolinium fluoride.

6. Luminescent material according to claim 1 in which the matrix material is lutetium fluoride.

7. Luminescent material according to claim 1 in which the activator is erbium.

8. Luminescent material according to claim 1 in which the activator material is thulium.

9. Luminescent material according to claim 1 and having the formula $$Ln_{1-x-y}Yb_xEr_yF_3$$

wherein Ln is at least one of Y, La, Gd, and Lu, $x$ is about 0.04 to 0.30, and $y$ is about 0.001 to 0.10.

10. Luminescent material according to claim 9 having approximately the formula $$La_{0.86}Yb_{0.12}Er_{0.02}F_3$$

11. Luminescent material according to claim 1 and having the formula $$Ln_{1-x-y}Yb_xTm_yF_3$$

wherein Ln is at least one of Y, La, Gd, and Lu, $x$ is about 0.04 to 0.80, and $y$ is about 0.00005 to 0.03.

12. Luminescent material according to claim 11 having approximately the formula $$La_{0.7985}Yb_{0.20}Tm_{0.0015}F_3$$

13. Luminescent material according to claim 11 having approximately the formula $$Gd_{0.5985}Yb_{0.40}Tm_{0.0015}F_3$$

14. A method for the production of luminescent material according to claim 1 in which an oxide of at least one of lanthanum, yttrium, gadolinium and lutetium, and an oxide of at least one of erbium and thulium and an oxide of ytterbium are reacted together with anhydrous hydrogen fluoride at elevated temperatures to produce the fluoride luminescent material essentially free from oxygen and hydroxyl impurities.

15. A method according to claim 14 for producing luminescent materials wherein the oxides are coprecipitated as oxalates, and the mixed oxalates are decomposed to oxides, and then the oxides are reacted at elevated temperateures with anhydrous hydrogen fluoride.

16. A method according to claim 14 in which the oxides reacted with anhydrous hydrogen fluoride are lanthanum oxide, erbium oxide, and ytterbium oxide.

17. A method according to claim 14 in which the oxides reacted with anhydrous hydrogen fluoride are gadolinium oxide, thulium oxide, and ytterbium oxide.

References Cited

UNITED STATES PATENTS 3,233,189   2/1966   Guggenheim et al. __ 252—301.4

OTHER REFERENCES

Brown et al.: Infrared Quantum Counter Action in Er-Doped Fluoride Lattices, Physical Review Letters, vol. 12, No. 13, Mar. 30, 1964, pp. 367–9.

Snitzer et al.: $Yb^{3+}$-$Er^{3+}$ Glass Laser, Applied Physics Letters, vol. 6, No. 3, Feb. 1, 1965, pp. 45–6.

TOBIAS E. LEVOW, Primary Examiner

R. D. EDMONDS, Assistant Examiner